Figure 4:
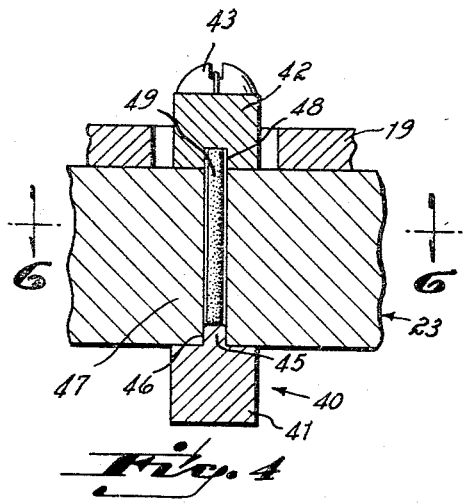

May 30, 1967
T. L. HALEY
3,323,056
D.C. MEASUREMENT USING CONDUCTOR SURROUNDING
CORE WITH PLURAL HALL GENERATORS HAVING
INDIVIDUAL FEEDBACK COILS
Filed July 5, 1963
3 Sheets-Sheet 1
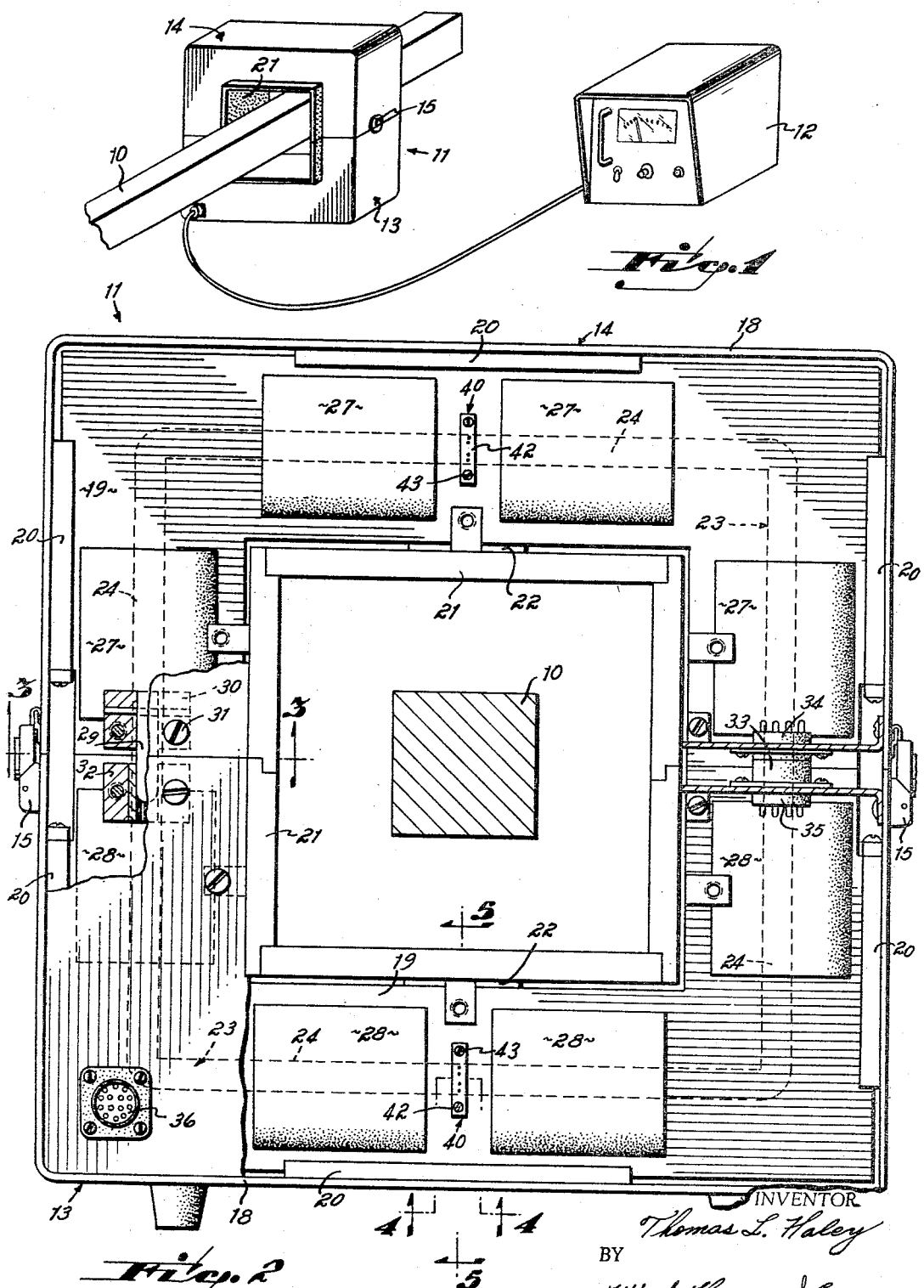
INVENTOR
Thomas L. Haley
BY
Wood, Herron and Evans
ATTORNEYS INVENTOR.
Thomas L. Haley
BY
Wood, Herron and Evans
ATTORNEYS

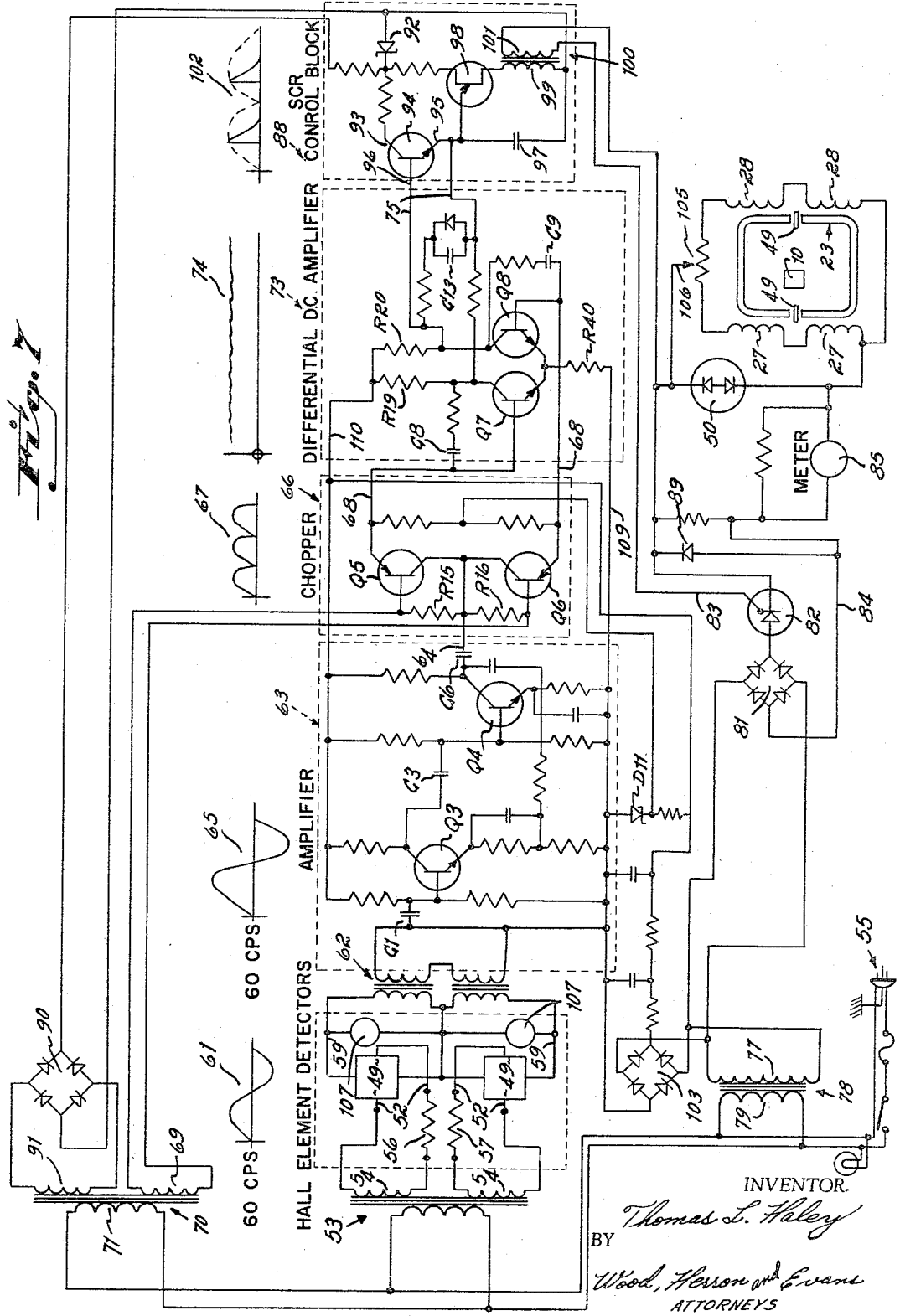

United States Patent Office 3,323,056
Patented May 30, 1967

3,323,056
D.C. MEASUREMENT USING CONDUCTOR SURROUNDING CORE WITH PLURAL HALL GENERATORS HAVING INDIVIDUAL FEEDBACK COILS
Thomas L. Haley, Columbus, Ohio, assignor to Halmar Electronics, Incorporated, Columbus, Ohio, a corporation of Ohio
Filed July 5, 1963, Ser. No. 292,952
10 Claims. (Cl. 324—117)

This invention relates to apparatus for measuring electrical currents and more particularly the invention is directed to apparatus for measuring direct current of the order of 500 amperes to as high as 1,000,000 amperes or greater. Currents of such magnitudes occur frequently in industry, as for example in the power supply systems employed in the extraction of aluminum and similar electrochemical processes.

The measurement of current of the order of 1,000 to 100,000 amperes or more creates a number of difficult problems. Two principal approaches have been made to the solution of the problems. The first approach contemplates the insertion of a shunt of known resistance in series with the current to be measured and then measuring the voltage drop across the shunt through the use of conventional equipment. This approach is used quite extensively but is subject to the disadvantage that the shunts and millivoltmeters used with them are quite expensive and the shunts tend to burn out.

Further, the shunts have a high power dissipation, are subject to change in calibration caused by aging and corrosion, and require interruption of the bus bar current for installation and repair. Still further, the measurement apparatus is not electrically isolated from the bus bar and therefore may be hazardous.

The other main approach is a shuntless system utilizing a known phenomenon which is that current passing through a conductor creates flux surrounding the conductor. It has been proposed to measure the flux density surrounding the conductor and, since the flux density is proportional to the current passing through the conductor the flux density measuring instrument can be calibrated in terms of the current in the conductor.

It is not practical to use such a system in which the flux density in air is measured. First, the flux density is related to the geometry of the conductor carrying the current and to the positioning of the detecting device with respect to the conductor. Second, the introduction of the detector into the magnetic field tends to influence the path of the flux lines and introduces a variable into the system for which there can be no accurate compensation. Third, the device will measure other stray flux fields.

It has therefore been proposed to surround the conductor with an iron core and to measure the flux density in the iron core. This proposal is reasonably satisfactory for the measurement of small currents but when currents of the magnitude of 1,000 amperes or higher are to be measured, the iron core tends to saturate before any useful measurement can be obtained and when saturated is as useless as if the detecting device were disposed in air. To avoid saturation it has further been proposed to apply to the core a bucking field proportional to or equal to the field created by the current passing through the conductor. In these proposals a rotating armature has been disposed in the air gap of the core surrounding the conductor. The current generated by the armature rotating in the field of the core is amplified and applied to windings on the core through a negative feedback circuit to maintain the flux density within the core below the saturation level.

These proposals are subject to two disadvantages. Most important of these is the fact that a large driving force (magnetomotive force or ampere turns) is necessary to effectively reduce to zero the flux created by current in excess of 100,000 amperes passing through the conductor in the core window. It may be possible, through the use of a power amplifier, to develop the needed ampere turns through the rotating armatures of the prior art devices but their use in the system is self-defeating insofar as the accuracy of the system is concerned. By its nature, the rotating armature requires a large air gap which greatly reduces the permeability of the core loop. The lower the permeability of the core loop the greater is the required magnetomotive force necessary to generate the error flux required by the negative feedback system. Stated another way, it takes a certain magnitude of error MMF in the negative feedback system to generate the field through which the armature rotates. When the core permeability is low the ampere turn error signal must be high in order to generate a given error flux. The higher the error signal the less accurate is the measuring system and the more subject it is to gain variations, etc.

Another disadvantage of prior art proposals resides in te fact that they are critically dependent on the system geometry. That is, unless careful attention is given to the physical relationship of the core to the conductor through which the measured current passes, it is possible to saturate portions of the core and thus fail to obtain an accurate current measurement.

It has been an objective of the invention to provide a direct current measuring apparatus having a high permeability core and a negative feedback system associated with the core designed to maintain the flux density in all segments of the core well below saturation, the negative feedback system having minimum error signal. This objective of the invention contemplates the use of high permeability core material having minimal air gaps into which thin Hall elements are disposed. The Hall element, a known device, generates a voltage which is directly proportional to the flux density passing through it. In accordance with the invention, the Hall voltage is amplified and fed back to windings surrounding the core material. In order to develop the required magnetomotive force to reduce the flux of the core substantially to zero, the invention provides an independent power supply connected to the negative feedback windings, and control means for making the magnitude of the current independently supplied directly dependent upon the magnitude of the Hall voltage. Thus, through the apparatus of the invention, the Hall generators can be employed and thus keep the permeability of the core loop high and the error signal low. As a consequence the overall accuracy of the system is much greater than ever has been possible heretofore.

It has been another objective of the invention to provide a portable ammeter utilizing a split core and having means for clamping the split core around a bus conductor. This objective of the invention contemplates a device which may be clamped about any conductor whose dimensions are such as to permit it to fit in the core window. It is designed to measure current in small and large conductors regardless of their cross sectional configuration or physical position within the core window. It is further the objective that the device be insensitive to air gap variation, to non-linearity of the hysteresis loop of the core, to stray fields or to large masses of ferro magnetic material adjacent the device when it is applied to the bus conductor.

The invention employs at least two Hall elements disposed in air gaps on opposite sides of the core, the Hall elements being interconnected so that the effect of stray fields is eliminated. Of itself, the interconnection of two Hall elements to eliminate stray fields is not a novel concept. In the present invention, however, the Hall elements are combined with a negative feedback system connected to coils adjacent the respective Hall elements, the feedback current in the coils being proportional to the Hall voltage of the respective Hall elements. This feature of the invention is particularly important in the clamp on ammeter for it eliminates the adverse effects of asymmetrical positioning of a conductor within a core window. To understand this feature of the invention it must be understood that under ideal conditions of uniform flux developed in the core by the conductor in the window being opposed by a substantially equal and uniform flux from the feedback system, the core will effectively disappear and will not distort the fields into which it is introduced. When a conductor is closer to one Hall element than the other, the flux density of the closer section of the core will be greater than in that section which is more remote. If the feedback current is applied uniformly to the coils on the core, one core section will have too much flux in opposition to that created by the conductor and the other too little. Under these conditions the core does not disappear but rather distorts the field into which it is introduced and adversely affects the measurement. Further, under certain conditions of disparity in flux density, one core section containing a Hall element will be operating in a non-linear portion of the core hysteresis loop while the other is operating in a substantially linear portion, thus adding additional variables to the system.

In one embodiment of the invention, the foregoing objective is attained by a compensatory system by which the inputs to the respective opposition coils can vary so that the flux generated by those coils is substantially equal to the flux in the core section on which the coils are disposed.

A somewhat different approach is taken in another embodiment of the invention. The devices of the prior art are dependent upon the proportionality of the current passing through the conductor to the flux density which that current generates. But flux density is a function of permeability and if any portion of the core saturates permeability is affected and the constant of proportionality upon which the system was originally designed no longer obtains. Rather than basing the system of this embodiment of the invention on the measurement of flux density, the objective is to measure the line integral of the magnetomotive force around the core loop, that is to sum the increments of magnetomotive force around the core loop. Since magnetomotive force is equal to ampere turns and since the number of turns is known, a system which provides the direct measurement of ampere turns obviously permits the direct measurement of amperes without the introduction of the factor of permeability which, under conditions of saturation, is subject to change. Specifically, this aspect of the invention contemplates the disposition of Hall generators around the core loop, the Hall generator having its own negative feedback system including windings mounted on the core closely adjacent Hall generator.

It has been another objective of the invention to provide current measuring apparatus of the type described in which the negative feedback system is designed to have as high an open loop gain as possible in order to reduce the magnitude of error signal.

It has been another objective of the invention to provide, in apparatus of the type described, a negative feedback system which is self protective against the adverse additions of overload currents.

It has been another objective of the invention to minimize the effects of ripple in the direct current of the bus conductor by disposing, around the core, a closed loop of conductive material. The alternating current component of the direct current which creates the ripple will induce an alternating flux in the core. That flux will, by transformer action, induce an alternating current in the loop which in turn induces an opposing alternating flux in the core and thus reduces the effects of ripple until it is of no consequence.

It has been another objective of the invention to provide an improved head construction in which the core and Hall elements are mounted, the improved construction including means for mounting the Hall elements in the core whereby a minimal air gap of predetermined size is maintained.

Figure 6:
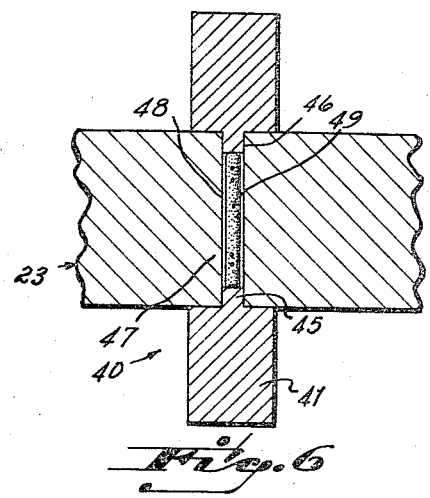
Figure 5:
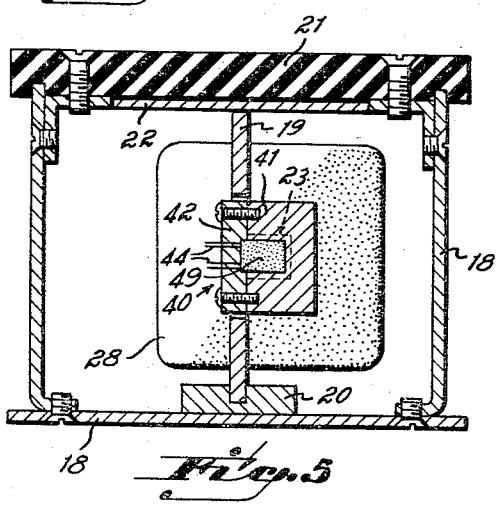
Figure 3:
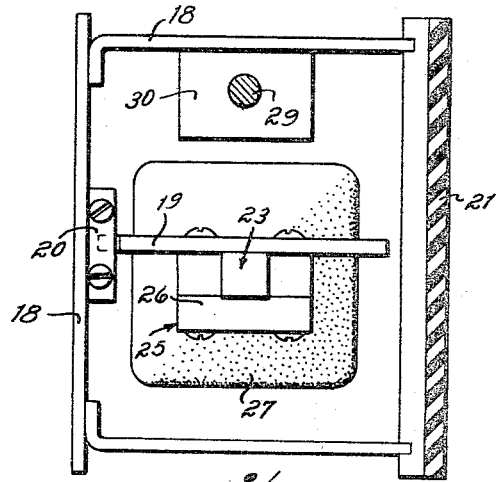
Figure 8:
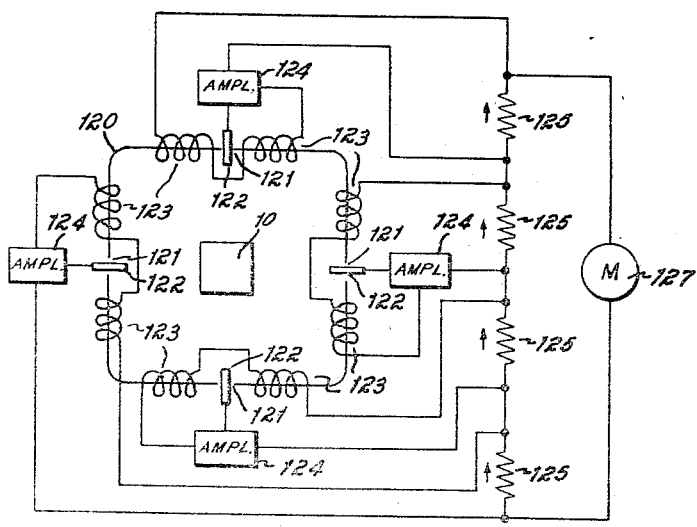

These and other objectives of the invention will become more readily apparent from the following detailed description taken in conjunction with the accompanying drawings in which:

FIG. 1 is a perspective view of apparatus employing present invention,

FIG. 2 is a front elevational view of a head assembly partly broken away containing the high permeability core and Hall generators, FIG. 3 is a cross sectional view taken along lines 3—3 of FIG. 2, FIG. 4 is a cross sectional view taken along lines 4—4 of FIG. 2, FIG. 5 is a cross sectional view taken along lines 5—5 of FIG. 2, FIG. 6 is a cross sectional view taken along lines 6—6 of FIG. 4, FIG. 7 is a circuit diagram of the invention, and FIG. 8 is a circuit diagram of an alternative form of the invention.

Referring now to the drawings, as shown in FIG. 1, a conductor 10 has a clamp on head 11 surrounding it, the clamp on head being connected to a meter 12. The head 11 is separated into a lower half 13 and an upper half 14, the two halves being tightly joined together by clamp fasteners 15. This split head construction permits the head to be applied to a bus which has been previously installed.

The details of head construction and elements contained therein are illustrated in FIG. 2. Each half of the head is formed of a split aluminum casing 18 within which a split center core plate 19 is mounted. Each half of the core plate is fixed in slotted bars 20 the bars being fixed by screws (not shown) to the casing walls. The slotted bars 20 are precisely positioned within each casing half in order to assure precise alignment of the core halves which are mounted on it when the casing halves are brought together. The three outside walls of the casing are preferably aluminum. The inside wall 21 is a nonconductive plastic which permits the casing to rest on the bus 10 and be electrically isolated from it. A conductive bar 22 is connected across the aluminum side walls at each end of the casing to form with the casing walls a conductive loop for minimizing ripple in the direct current of bus 10.

A core 23 is formed of four L-shaped segments 24 and are mounted at their ends to the core plate 19 by straps 25. One of the straps is illustrated in FIG. 3 and comprises a U-shaped member 26 secured to the core plate 19 by screws in such a manner as to clamp the core to the plate. There are a number of different alloys which may be used as material for the core 23. In the preferred embodiment the core material is a silicon steel having a low residual magnetism and a high permeability. Eight opposition coils or windings 27 and 28 are mounted on the upper and lower halves respectively of core 23 and are electrically connected to the system in a manner to be described below. The function of the coils 27 and 28 is to provide bucking flux substantially equal to the flux created by the current passing through the conductor 10 so as to avoid saturation of the core.

On one side of the casing as illustrated in FIG. 3 a dowel pin 29 is fixed to the casing by means of a block 30 which is attached to the case wall by screws 31. The dowel pin 29 projects into a female block 32 which is similarly fixed to the wall of the casing of the lower half 13 of the head 11. The cooperation of the dowel pin 29 with the block 32 provides proper alignment of the two halves of the head when they are brought together around the conductor 10.

At the other side of the head is a connector 33 including an upper member 34 from which a plurality of connector pins (not shown) project into a lower half 35. The connector 33 provides an electrical communication between the upper half 14 of the head with the lower half 13 of the head. All connections from the electrical elements within the head are made to the instrument 12 through a jack 36 fixed to the outside surface of the lower half 13 of the case.

In the embodiment illustrated, two Hall elements are employed and are mounted in receptacles 40 in each half of the head. It should be understood that additional Hall elements could be mounted in either casing half at its exposed ends so as to be brought into the magnetic circuit when the casing halves are joined together. The receptacle in which the Hall elements are mounted is illustrated in FIGS. 4, 5 and 6. The receptacle comprises a U-shaped body 41 enclosed by a cap 42 the cap being secured to the U-shaped body by screws 43. The cap has a pair of holes 44 through which the four leads to the Hall element pass. The U-shaped body 41 has a central flange 45 forming a pair of shoulders 46 against which ends 47 of core segments 24 butt when the head is assembled. The cap has a slot 48 which receives one edge of the Hall element 49. The engagement of ends 47 of the core segments 24 with the shoulders 46 of the receptacle body provide a space in which the Hall element is located and prevents such contact with the core segments as might damage the Hall crystal. Additionally, the flange 45 assures uniformity of the air gap size between the two core segments.

The electrical circuit

The electrical circuit for the invention is diagrammatically illustrated in FIG. 7. The core 23 and windings 27 and 28 around the core are illustrated at the lower right-hand corner of the circuit diagram. The circuit connected to the windings is protected by a thyrector 50 which will break down when voltages exceeding its rating are applied to it and will act as a short-circuit across the windings 27 and 28.

The two Hall elements 49 are disposed in the core air gaps as described above and have their control leads 52 connected to a transformer 53 having a pair of secondary windings 54. The transformer 53 is connected to a 115 volt alternating current supply indicated at 55. The control leads are in series with resistors 56 and 57 which limit the control current and which are used for balancing the two Hall elements for a generator match. A "generator match" simply means that the transduction factor of the Hall elements is equal, that is, the same field applied to each Hall element will produce the same output voltage. In this embodiment the Hall elements have their Hall or output leads connected in series to sum their voltages. The output of the Hall elements is indicated at 59.

The Hall voltage in the output 59 is a function of the flux density in the core 23 and it is the purpose of the circuit described below to amplify the Hall voltage and feed it back to the windings 27 and 28 around core 23 in such a manner that the windings 27 and 28 will create a flux in the core 23 in opposition to that created by the current passing through the conductor 10. The circuitry by which this is accomplished is constituted in general as follows:

The output of the Hall element detectors indicated at 59 has an alternating current sine wave form illustrated at 61. It is fed through a transformer 62 into an alternating current amplifier 63 the output of which indicated at 64 is an alternating current sine wave illustrated at 65. The output of amplifier 63 is fed into a chopper 66. The chopper 66 functionally operates as a switch to invert the negative wave of the amplifier output to provide a direct current wave illustrated at 67 at the output 68 of the chopper. The switching is triggered by a secondary winding 69 of transformer 70 whose primary 71 is connected to the alternating current supply 55, the output of winding 69 forming the chopper drive.

The output of the chopper is fed into a differential direct coupled amplifier and filter 73 which amplifies the chopper output and converts it to a low ripple wave form indicated at 74, that wave form appearing at the output 75 of the differential amplifier.

Thus far the function of the circuit has been to amplify the alternating current output voltage from the Hall elements 49 and convert it to a low ripple direct current voltage 74. The magnitude of the output voltage 74 of the amplifier is a direct function of the amplitude of the output voltage of the Hall elements which in turn is directly dependent upon the current flowing through the conductor 10. The output voltage 74 then is to be employed to control the current flowing through the opposition windings 27 and 28.

The current in the windings 27 and 28 is supplied from the secondary 77 of the transformer 78 whose primary winding 79 is connected across the alternating current supply 55. The secondary 77 is connected across a full wave rectifier 81. One output lead of the rectifier 81 is connected through a silicon controlled rectifier 82 to the opposition winding 27. The other output lead 84 is connected through a meter 85 of known design to the other side of the opposition winding 27. The meter 85, measuring the feedback current to the opposition windings provides, with suitable calibration, a measurement of the current passing through the conductor 10.

The silicon controlled rectifier 82 permits the passage of current to the opposition winding but only passes current or conducts when it is triggered by a voltage of a suitable magnitude from lead 83. To provide that voltage pulse, the circuit incorporates a control block 88 for the silicon controlled rectifier. The control block sends to the silicon controlled rectifier a pulse during each half cycle, that is during each pulse from the full wave rectifier 81. The angle of the pulse, that is the instant during the half cyce in which it occurs, from the control block determines the point in time at which the rectifier 82 will fire. The rectifier 82, when fired, will continue to conduct until the voltage from the rectifier bridge 81 goes to zero. Thereafter, conduction through rectifier 82 will discontinue until it has been again initiated by another pulse from the control block. During that portion of the cycle when the rectifier 82 is not conducting the decaying current in the coils 27 and 28 has a path through rectifier 89.

The energy for the control block pulse is obtained from a bridge rectifier 90 which is connected across a secondary 91 of transformer 70. The rectified current is fed through a Zener diode 92 to the collector terminal 93 of a transistor 94. The transistor 94 acts as a valve for the clipped full wave rectified current passing through the Zener diode 92. The magnitude of the current passing from the collector 93 to the emitter 95 is controlled by the magnitude of the voltage on the base 96 which is dependent upon the output voltage of the differential direct current amplifier 73.

Current from the transistor 94 charges a condenser 97. When the charge on the condenser reaches a certain level, controlled by the unit junction transistor 98, the condenser discharges through a primary winding 99 of transformer 100, the secondary one 101 of which is connected to the silicon controlled rectifier 82.

The embodiment of FIG. 7 is provided with a compensator circuit to eliminate the effect of the position of the conductor within the core window. The compensator circuit is used after the head has been clamped around a conductor. It can be positioned in any convenient manner, but once positioned it should remain until the measurements are completed. When it is in position, the compensator is adjusted in the manner to be described below so as to effect an equalization around the core loop of the opposition flux to the flux induced by the conductor 10.

As illustrated in FIG. 7, the compensator circuit includes a potentiometer 105 connected in series with windings 27 and 28. The variable tap 106 of the potentiometer is connected to the output of the silicon controlled rectifier 82. The output from the rectifier is thus distributed between the windings 27 and 28 in accordance with the position of the variable tap 106.

In order to determine the amount and direction of the adjustment of the center tap 106, a pair of voltmeters 107 are connected across the output leads of the respective Hall elements 49. If the conductor 10 is positioned closer to one Hall element than the other, initially a greater voltage will appear on the voltmeter associated wtih the closer Hall element. The potentiometer is then adjusted until the windings adjacent that Hall element receive a greater proportion of the feedback current. The adjustment is continued until there are identical readings on the voltmeters 107.

It should be understood that while the potentiometer 105 is illustrated as being manually adjusted in accordance with the readings on visible voltmeters, a compensator employing the principle disclosed herein can be made fully automatic without departing from the spirit and scope of the invention.

Amplifier circuit

The amplifier 63 is fed from the transformer 62 which transformer provides a gain of approximately 16. The gain of the amplifier 63 is approximately ten and it comprises a two-stage alternating current amplifier whose input is connected to the transformer 62 through an isolating capacitance C-1. The output of the amplifier is connected to the chopper 66 through an isolating capacitance C-6. The B voltage for the system is supplied by the transformer 78 whose secondary is connected to the full wave bridge rectifier 103.

The amplifier 63 employs two NPN transistors Q-3 and Q-4, each having a common emitter connection. The output at the collector of transistor Q-3 is connected through a capacitance C-3 to the base of transistor Q-4.

Chopper circuit

The chopper is a known circuit employed to convert alternating current to direct current or vice versa. In the present embodiment, its function is to convert alternating current to direct current and is essentially a switch which reverses itself at each half cycle of the alternating input from amplifier 63 to flip the negative pulse of wave form 65 to a positive direction as illustrated at 67. The chopper employs two PNP transistors Q-5 and Q-6 having their collectors connected together and having their bases connected across current limiting resistors R-15 and R-16 which are connected across the output of the chopper drive 69.

The alternating current output 64 of the amplifier 63 is connected to the interconnected collectors of transistors Q-5 and Q-6 and is in-phase with the output of the chopper drive 69. At each half cycle, the transistors are alternately changed from conducting to non-conducting so that the output from 64 flows first through the collector emitter circuit of one transistor and then the emitter-collector of the other transistor, thereby converting the alternating current to the direct current illustrated at 67.

In addition to the conversion of alternating current to direct current the chopper is important to the efficiency of the system in the elimination of noise, extraneous quadrature components, etc. Since the ideal conversion of alternating current to direct current requires an exact in-phase relationship between the chopper drive and the input current from amplifier 63, extraneous noise and quadrature components will appear at the output of the chopper as alternating current having a net-zero direct current component. These components will be filtered by condensers C-8 and C-9 and will not pass into the differential direct coupled amplifier 73.

Differential direct coupled amplifier

The differential direct coupled amplifier employs two NPN transistors Q-7 and Q-8 whose emitters are tied together and to a resistor R-40. The resistor R-40 is connected to a common line 109 which is maintained at approximately −6.0 volts by a 6 volt Zener diode D-11. The collectors are connected to matched resistors R-19 and R-20, the resistors being tied together and connected to the 12 volt B+ −110.

The current flowing from collector to emitter due to the voltage difference between lines 110 and 109 split evenly between the resistors R-19 and R-20. When no current is applied to the bases of the transistors, no voltage appears at the output 75 across the two resistors. When a direct current signal from the output 68 of the chopper appears across the bases of the transistors Q-7 and Q-8, the base current in one transistor will be increased and base current in the other will be decreased. Since the collector current of the transistor increases with the base current, a greater current will pass through one of the transistors R-19 and R-20 than in the other thereby producing a voltage drop across the amplifier output 75. That output is filtered through condenser C-13 and appears as illustrated at 74 at the input to the SCR control block 88.

Operation

The first step is to apply the head to the conductor 10. Assuming current is flowing in the conductor it is necessary to energize the apparatus so that the magnetic force tending to resist the application of the core is reduced to substantially zero by the negative feedback circuit.

As a current passes through the conductor 10, a flux surrounding the conductor is generated, the flux following a path of high permeability through the core 23. The flux lines pass perpendicularly through the Hall elements 49 which are disposed in the two opposite air gaps in the core loop. The combination of the flux density passing through the Hall elements and the alternating current applied to the control leads 52 causes an alternating current voltage, called the Hall voltage, to be generated at the output terminals 59 of the Hall elements. Because of the series connection of the Hall elements, the voltage appearing at 59 is the sum of the Hall voltages generated in the two elements.

The alternating output voltage is supplied through transformer 62 to the amplifier 63. The amplified output at 64 is transmitted to the chopper where it is converted to a higher ripple direct current indicated by the wave from 67. The direct current output of the chopper is applied to the input of the differential of the D.C. amplifier where it is amplified and converted to a low ripple direct current indicated by the wave form 74.

The wave form 74 is applied to the input of the SCR control block to control the angular position of direct current pulses illustrated at 102. The angular position, called firing angle, of the pulses 102 is controlled by the magnitude of the voltage 74 from the output of the differential amplifier. As the amplifier output increases, the firing angle decreases, that is to say the pulses 102 move toward the left. Conversely, as the amplitude of the voltage 74 decreases, the firing angle increases and the pulses move toward the right. The firing angle should normally be preset to occur at ninety degrees under normal operating conditions.

The output of the SCR control block, at transformer 100, is applied to the silicon controlled rectifier 82 causing it to pass current from the rectified current of transformer 78 to the opposition winding 27 on the core 23. The root means square value of the current passed to the windings is dependent on the firing angle of the pulses 102. If the firing angle is small, a large amount of current is passed. Conversely, if the firing angle is large, a small amount of current is passed.

The current in the opposition windings 27 and 28 is thus directly dependent upon the magnitude of the current passing through the conductor 10. The meter 85 measures the feedback current to the windings 27 and 28 and, with proper calibration, provides a measure of the current flowing through the conductor 10.

Because of the combination of Hall plates permitting minimal air gaps in the core loop, and the high gain negative feedback circuit, the error signal of the system is maintained at less than five percent and preferably does not exceed one percent. The gain of the system is preferably 500 to 1,000.

The combined silicon controlled rectifier and control block provides a protective system for the feedback coils 27 and 28. The system is so designed that at its normal full scale output or its normal full scale measured input current or at its full scale indication on its output meter, the firing angle on the SCR circuit is approximately 90 degrees. The circuit is applying half or just slightly better than half of the maximum possible feedback current to windings 27 and 28. If the input current that's being measured exceeds the rating of the instrument by a factor of 2 to 1, for example, the firing angle controlling the SCR which thereby controls the feedback current can go no farther than the zero degree conduction point. This effectively limits the amount of feedback current that can be returned into the coils, thereby protecting the coils from receiving an over-current from an over-current condition in the measured conductor 10. Thus, the feedback current is limited to approximately twice its normal full range operating value. The conductor current can go to 10 to 100 times its maximum rating, without causing any failure of winding or meter components. In other words, again the feedback current is limited to approximately twice its normal maximum value at which time the system will saturate and limit that current effectively at about, at approximately 75 to 100 percent rating.

*Alternative embodiment*

An alternative circuit is illustrated in FIG. 8. That circuit employs four Hall elements each having a separate amplifier feeding back to windings on the portion of the core adjacent the Hall element whose signal is amplified. This circuit might be termed a four-channel circuit in that it employs four Hall elements each having separae feedback systems. It should be understood, that by the elimination of two Hall elements and their associated feedback circuits, a two-channel system is obtainable. The two-channel system actually functions almost equally as well as the four-channel system.

More specifically, the core 120 has four air gaps 121 equally spaced around the core loop, each air gap having a Hall element 122 disposed therein. On each side of the Hall element is a winding 123 which is connected by way of a negative feedback circuit to an amplifier 124. The amplifier receives a voltage output from the Hall element 122 in a manner similar to that described in connection with the circuit diagram of FIG. 7.

The feedback circuit from the amplifier to the windings 123 includes a series resistor 125. The series resistors associated with each amplifier are connected in series so that the voltage drops across each are summed, the total voltage drop being measured by a suitable meter 127.

The circuit of FIG. 8 provides several advantageous features. The ultimate objective of the invention is to obtain a measurement of the line integral of magnetomotive force around the core loop. This is a measure of the magnetomotive force of the opposition windings which in turn is a measure of the magnetomotive force created by the passing through the conductor 10. Since magnetomotive force may be expressed in terms of ampere turns and since there is only a single turn involved, that is conductor 10, the line integral or magnetomotive force provides a direct measurement of the current passing through the conductor. This relationship may be expressed as follows:

$$MMF = NI = \int H dl$$

Ideally if an infinite number of Hall elements could be employed in the core loop, the magnetomotive force around the loop could be integrated. The circuit of FIG. 8 represents an approach toward the ideal referred to above. In FIG. 8, four Hall elements are employed each with its own negative feedback amplification system to its opposition windings and the sum of the currents in the negative feedbacks circuits is measured. Because of the disposition of Hall elements and feedback windings at equal points around the circuit, the effect of local saturation because of the positioning of the current conductor 10 closer to one segment of the core than to the remainder of the core is eliminated. Further, the effect of stray fields is eliminated for the field affecting one Hall element would affect another opposed Hall element in an equal and opposite direction so that the effects of the stray field would be cancelled at the summing point across the resistors 125.

Still further, it is possible that once installed, the characteristics of the one Hall element might change as for example if it were positioned near a hot spot or in the direct sunlight. The slight difference in response due to the unbalance of the Hall elements and/or air gaps would appear to the system as an indication of current through the conductor. However, by employing the two- or four-channel system, each Hall plate has its own feedback system which automatically compensates for the unbalance.

I claim:
1. Apparatus for measuring direct current passing through a conductor comprising:
   a core of high permeability surrounding said conductor and having at least one air gap,
   a Hall generator disposed in said air gap,
   conductive coils on said core,
   full wave rectified current source connected to said coils to create a flux in said core in opposition to the flux created by the current through said conductor,
   a silicon controlled rectifier in series with said current source and said coils,
   circuit means connected between said Hall generator and said rectifier for applying pulses every half cycle to said rectifier, the firing angle of said pulses being dependent upon the magnitude of the voltage generated by said Hall generator, and
   means for measuring said direct current.

2. Apparatus for measuring direct current passing through a conductor comprising:
   a core of high permeability surrounding said conductor and having four air gaps,
   four Hall generators disposed in said air gaps,
   a pair of conductive coils for each Hall generator and mounted one on each side of said Hall generator and wound on said core,
   a direct current source connected to each pair of said coils to create a flux in said core in opposition to the flux created by the current through said conductor,
   means for varying the magnitude of the current applied to each said pair of coils in direct relation to the amplitude of the output of said respective Hall generator, and
   means for measuring the sum of said direct currents applied to each said pair of coils.

3. Apparatus for measuring direct current passing through a conductor comprising:
   a magnetic core of high permeability surrounding said conductor and having at least two spaced air gaps,
   a Hall generator disposed in each said air gap and having control leads and Hall leads,
   individual coils on portions of said core with each coil being closely adjacent one respective Hall generator and remote from the other Hall generator,
   amplifier means amplifying and converting the total output of said Hall generators to direct current proportional to the total output of said Hall generators, means connecting the output of said amplifier means to said coils to create a flux in said core in opposition to the flux created by the current in said conductor, said connecting means including means for selectively distributing the amplifier output to said coils to make the flux induced in said core portions by said respective coils substantially equal to the flux induced by said conductor in the portions of said core adjacent the respective coils, whereby the measuring apparatus is compensated for non-uniform flux density in different core portions due to said conductor not being centered in said surrounding core, and means for measuring the total current in said coils.

4. Apparatus for measuring direct current passing through a conductor comprising:
- a core loop of high permeability surrounding said conductor and having two air gaps disposed equidistant around said loop,
- a Hall generator disposed in each of said air gaps on opposite sides of said loop and having control leads and Hall leads,
- a set of feedback windings on said core adjacent each said Hall generator, said feedback windings being connected in parallel,
- amplifier means amplifying and converting the output of said Hall leads to direct current proportional to the output of said Hall leads,
- means connecting the output of said amplifier through a potentiometer to said windings to create a flux in said core in opposition to the flux created by the current in said conductor, said potentiometer providing means for selectively variably distributing the current in said respective windings; and
- means for measuring the total current in said coils.

5. Apparatus for measuring direct current passing through a conductor comprising:
- a core of high permeability surrounding said conductor and having at least two air gaps,
- two Hall generators disposed in said air gaps,
- a pair of conductive coils for each Hall generator and mounted one on each side of said Hall generator and wound on said core,
- a direct current source connected to each pair of said coils to create a flux in said core in opposition to the flux created by the current through said conductor,
- means for varying the magnitude of the current applied to each said pair of coils in direct relation to the amplitude of the output of said respective Hall generator, and
- means for measuring the sum of said direct currents applied to each said pair of coils.

6. The apparatus of claim 5 wherein said Hall generators are spaced equidistant around said core.

7. The apparatus of claim 5 wherein said direct current source comprises amplifier means for amplifying and converting the output of said Hall generators to direct current proportional to said output, and wherein said means for varying the magnitude of the current applied to each of said pairs of coils comprises a potentiometer connected between the output of said amplifier and said coils for selectively variably distributing the current in said respective windings.

8. The apparatus of claim 5 wherein said direct current source and said means for varying the magnitude of current applied to each of said pair of coils comprise at least two amplifiers, each connected between the output of different Hall generators and respective pairs of said coils for converting the different Hall generators outputs to proportional direct currents and applying said proportional direct currents to their associated coils.

9. The apparatus of claim 8 wherein said Hall generators are spaced equidistant around said core.

10. Apparatus for measuring direct current passing through a conductor comprising,
- a magnetic core of high permeability surrounding said conductor and having at least two spaced air gaps,
- at least two Hall generators, each disposed in a different one of said air gaps,
- an individual coil for each Hall generator, each of said coils being wound on portions of said core closely adjacent its respective Hall generator,
- a direct current source connected to each coil to create a flux in said core substantially equal to and in opposition to the flux created by the current in said conductor,
- means for independently varying the magnitude of the current applied to each of said coils in direct relation to the amplitude of the output of the Hall generator associated with its respective coil, whereby the measuring apparatus is compensated for non-uniform flux density in different core portions due to said conductor not being centered in said surrounding core, and
- means for measuring the sum of said direct currents applied to each of said coils.

References Cited
UNITED STATES PATENTS

| | | | |
|---|---|---|---|
| 2,236,277 | 3/1941 | Sturtevant | 324—110 X |
| 2,800,630 | 7/1957 | Kowalczyk | 324—127 |
| 2,928,048 | 3/1960 | Postal | 324—117 |
| 2,988,707 | 6/1961 | Kuhrt | 324—45 X |

FOREIGN PATENTS

| | | |
|---|---|---|
| 618,580 | 4/1961 | Canada. |
| 344,575 | 3/1931 | Great Britain. |

WALTER L. CARLSON, *Primary Examiner.*

RUDOLPH V. ROLINEC, *Examiner.*